United States Patent [19]
Kimura

[11] 3,710,705
[45] Jan. 16, 1973

[54] CAMERA WITH A POWER-DRIVEN FILM WINDING DEVICE

[75] Inventor: Shuji Kimura, Tokyo, Japan
[73] Assignee: Nippon Kogaku K.K., Tokyo, Japan
[22] Filed: Jan. 24, 1972
[21] Appl. No.: 219,951

[52] U.S. Cl. .................................. 95/31, 95/34
[51] Int. Cl. ............................... G03b 19/00
[58] Field of Search .......................... 95/31, 34

[56] References Cited

UNITED STATES PATENTS 3,587,425  6/1971  Biber ............................ 93/31

Primary Examiner—John M. Horan
Attorney—Fitzpatrick, Cella, Harper & Scinto

[57] ABSTRACT

A camera is provided with a power-driven film winding device in which a high-voltage circuit is completed upon depression of an operating button so as to supply high voltage to a motor to wind a film at high speed for phototaking; and upon releasing of the operating button, the high-voltage circuit is changed over to a low-voltage circuit so as to wind the film with the aid of low voltage after the phototaking and ensure that the motor stops at a predetermined position where subsequent film winding and shutter charging is completed.

6 Claims, 6 Drawing Figures

CAMERA WITH A POWER-DRIVEN FILM WINDING DEVICE

BACKGROUND OF THE INVENTION

1. Field of the Invention

This invention relates to cameras and more particularly, to cameras equipped with a power-driven film device.

2. Description of the Prior Art

The conventional power-driven film winding device comprises a mechanism for depressing a shutter release button, and a drive mechanism for sequentially and continuously repeating the film winding and shutter charge and release operations by rotation of an electric motor. In operation, the film winder is such that as long as a button for continuous phototaking is depressed the motor remains connected with a power source and continues to revolve, thereby permitting the repetition of film winding and shutter charge and release, and that when the button for continuous phototaking is released, an electric brake acts quickly to stop the motor at a position in which further film winding and shutter charge has been completed for the next phototaking operation.

With such a conventional power-driven film winder device, continuous phototaking at a high speed of seven frames or more per second, if desired, can be carried out by supplying the electric motor with a source voltage necessary to obtain a number of revolutions of the motor corresponding to such phototaking speed, but it has hardly been possible to stop the motor at the end of the phototaking operation because the electric brake required for such purpose is not sufficient to absorb all the inertia of the rotating member in the motor; and if the motor could be stopped at all, it was not possible to predict in what position the motor would come to rest.

Therefore, in the conventional power-driven film winder device, a speed of four frames or so per second has been the maximum limit for continuous phototaking which can ensure stoppage of the motor at a position where subsequent film winding and shutter charge has been completed after the completion of the preceding continuous phototaking cycle, and any higher speed than that could not be adopted for continuous phototaking.

SUMMARY OF THE INVENTION

It is an object of the present invention to overcome the above-noted disadvantages peculiar to the prior art and to provide a camera equipped with a power-driven film winder device which ensures that its motor will be stopped at a position where subsequent film winding and shutter charge has been completed, even after a preceding continuous phototaking operation at a high speed of seven frames or more per second has been effected.

According to a broad feature of the present invention, there is provided a camera with automatic film advance and shutter cocking means which comprises an electric motor, drive means interlocked with the motor to cock and release a shutter and advance a film with rotation of the motor, a first electrical switch movable between a first and a second position, means responsive to the movement of the drive means automatically to move the first switch to its second position upon completion of film advancing and shutter cocking and to its first position upon completion of shutter releasing, a first electrical power source, a second electrical power source connected in series with the first power source, a high-voltage circuit including the first and second electrical power sources to energize the motor by the total voltage of the both power sources, a low-voltage circuit including the first electrical power source to energize the motor by the voltage of the first power source, a circuit for short-circuiting two terminals of the motor to stop the motor, first switching means for controlling the low and high voltage circuits movable between a first position in which the high-voltage circuit is closed in either position of the first switch and a second position in which the low-voltage circuit is closed when the first switch is in its first position and in which the short-circuiting circuit is closed when the first switch is in its second position, said first switching means normally being in its second position, and first manually operable means for maintaining the first switching means at its first position while the operable means is operated.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
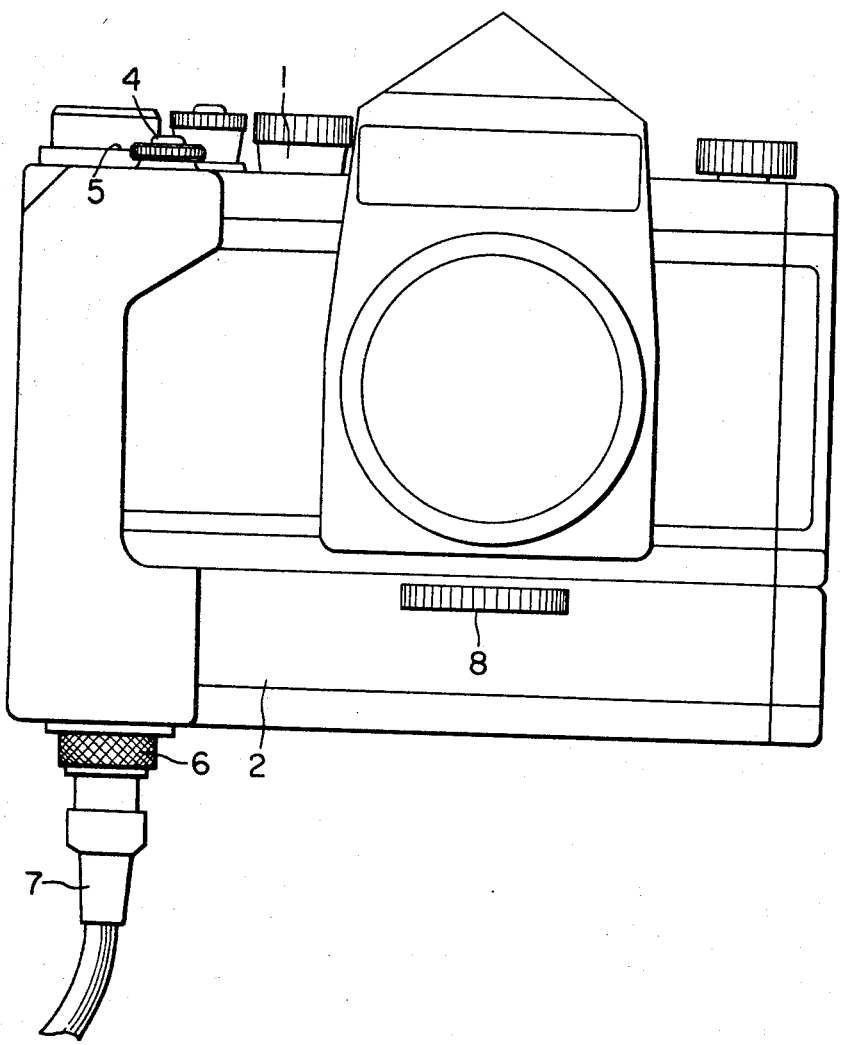
FIG. 1 is an elevational view showing the appearance of a camera according to a first embodiment of the present invention.

Referring to FIG. 1, there is shown a camera according to the present invention wherein a camera body 1 has a power-driven film winder device 2 attached thereto by means of a set screw 8, and a grip portion 3 integral with the film winder device 2 and provided on the front face of the camera. The camera further includes an operating button 4, a protective ring 5 for the operating button, and a connector 6 for connection with power sources to be described. The connector 6 consists of three terminals, as indicated at 6–1, 6–2 and 6–3 in FIG. 2. Numeral 7 designates a connection cord.

Figure 2:
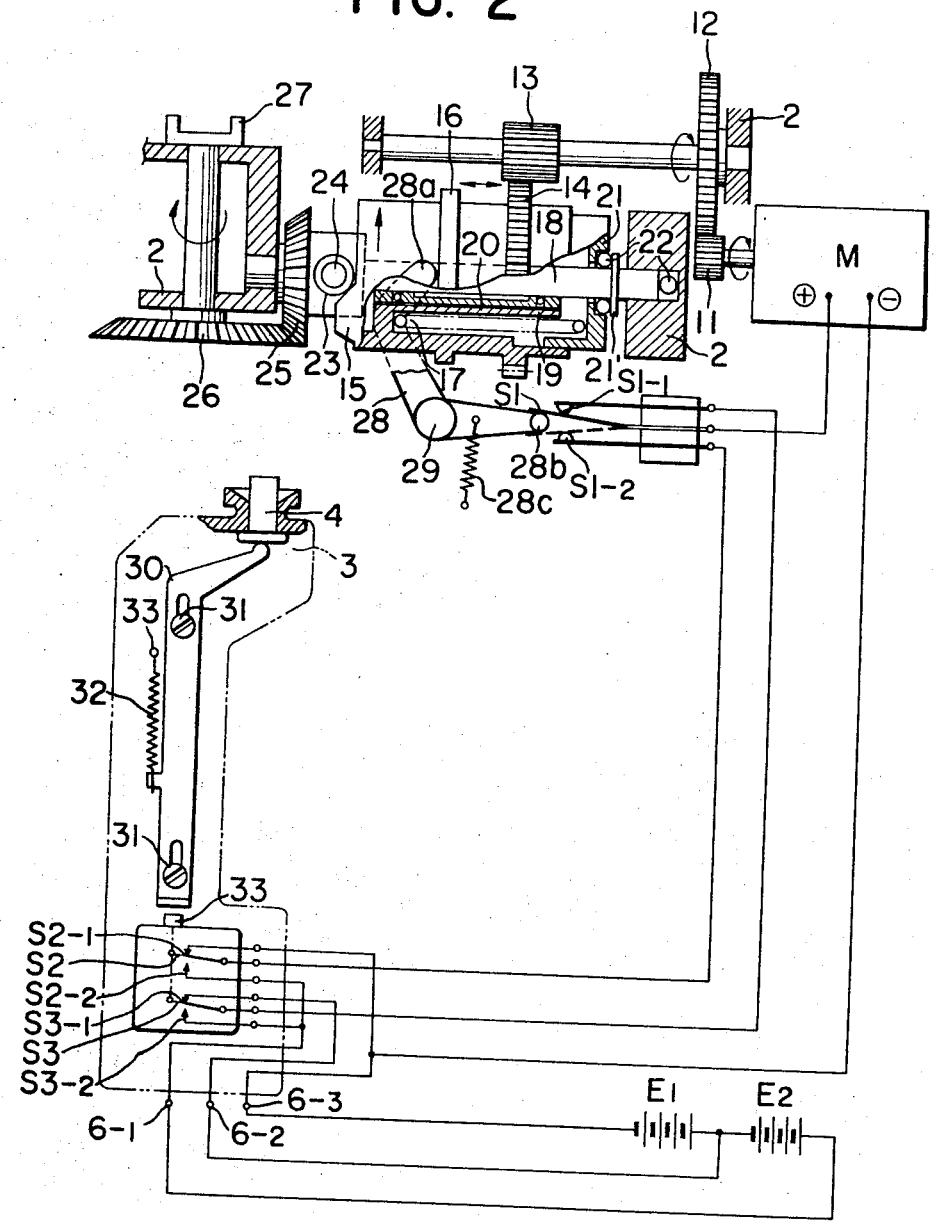
FIG. 2 is a combined schematic view and circuit diagram showing the device according to a first embodiment of the present invention.

FIG. 2 schematically shows a construction according to one embodiment of the present invention. An electric motor M has an output shaft carrying thereon a gear 11, which is connected via gears 12 and 13 to a gear 14. Formed integrally with the gear 14 is a thrust cam 15 having a projected flange 16. The gear 14 and the cam 15 with the flange 16 are slidably and rotatably supported on a shaft 18 by means of balls 19 and retainer 20. A spring 17 is provided to bias the thrust cam 15 in such a direction that its camming surface is urged into contact with a roller 23 rotatably mounted on a shaft 24 which is integral with the shaft 18. The spring 17 is received by a member 21 which is restrained from axial movement on the shaft 18 by balls 22 and stop 21'. A bevel gear 25 is formed integrally with the shaft 18 and in meshing engagement with a larger bevel gear 26, and a winder shaft 27 connected for rotation with the gear 26, is in engagement with the camera's winding shaft (not shown).

A lever 28 is pivotally mounted on a shaft 29 and biased counter-clockwise by a spring 28c. One end 29a of the lever 28 is normally biased into contact with the aforesaid flange 16 by the force of the spring 28c while the other end 28b of the lever 28 is engaged with a first switch S1 so as to change over this switch. Although not shown, it should be understood that there is provided a conventional mechanism whereby a shutter may be released by the leftward movement of the flange 16 of the cam 15, as viewed in FIG. 2. The first switch S1 may be changed over between a contact S1-1 and a contact S1-2.

There is further provided a second switch S2 which may be changed over between a contact S2-1 and a contact S2-2; and a third switch S3 is provided which may be changed over between a contact S3-1 and a contact S3-2. The second and third switches S2 and S3 are interlocked switches whose movable contacts can be changed over in association with each other.

A vertically extending lever 30 is biased by a spring 32 in a direction for contact with the operating button 4 and is slotted for vertical movement along guide screws 31. The lower end of the lever 30 is opposed to an interlocking pin 33 for the interlocked switches S2 and S3. The terminals 6–1, 6–2 and 6–3 of the connector 6, which are shown in FIG. 1, are connected with power sources such as batteries E1 and E2 in the manner as shown.

The operation of the embodiment shown in FIG. 2 will now be described in detail.

In FIG. 2, the parts are shown in position in which film winding and shutter charge has been started. In this position, there is formed a low-voltage circuit consisting of E1 – (6–3) – ⊖M⊕ – (S1-1) – (S3-1) – (6-2) – E1 so that the motor M revolves in the direction shown by the arrow, and such revolution is transmitted to the cam 15 via gears 12, 13 and 14. As a result, the bevel gear 25 is rotated with the cam 15, due to the engagement between the camming surface of the cam 15 and the roller 23. The rotation of the bevel gear 25 is transmitted to the winder shaft 27 via the larger bevel gear 26, thus accomplishing the film winding and shutter charge in the camera.

When the film winding and shutter charge in the camera has been completed, the shaft 27 is restrained from further rotation by a winding restrainer (not shown) and accordingly the bevel gear 25 is prevented from rotating. Nevertheless, the motor M still continues its revolution, which is transmitted to the cam 15, so that the cam 15 can rotate about the shaft 24 of the roller 23 while being moved to the right (as viewed) on the shaft 18 against the force of the spring 17. Thereupon, the lever 28 is rotated clockwise by the force of the spring 28c. When the cam 15 has moved rightwardly on the shaft 18 until the top of its camming surface rides on the roller 23, the end 28b of the lever 28 actuates the first switch S1 to change it over from the contact S1-1 to the contact S1-2. Thereupon, there is formed a short-circuiting circuit consisting of M⊕ – (S1-2) – (S2-1) – M⊖, and acting as an electric brake to stop the motor M quickly. Thus, the motor M stops at a position in which film winding and shutter charge has been completed.

Subsequently, the operating button 4 is depressed for phototaking, whereby the switches S2 and S3 are changed over by lever 30 and button 33 to their respective contacts S2-2 and S3-2. Thereupon, there is formed a high-voltage circuit consisting of E1 – (6-3) – ⊖M⊕ – (S1-2) – (S2-2) – (6-1) – E2 – E1, so that the motor M is revolved at a high speed. This revolution causes the rotation of the cam 15 so that the top of its camming surface is disengaged from the roller 23, whereupon the spring force stored in the spring 17 forces the cam 15, its flange 16 and gear 14 to move leftwardly (as viewed) on the shaft 18. With the leftward movement of the flange 16, unshown conventional means releases the shutter. At that time, the lever 28 is rotated counter-clockwise against the force of the spring 28c until the end 28b thereof actuates the switch S1 to change it over from the contact S1-2 to the contact S1-1. Thus, there is formed a high-voltage circuit consisting of E1 – (6-3) – ⊖ M⊕ – (S1-1) – (S3-2) – (6-1) – E2 – E1, so that the motor M is allowed to continue its revolution which is transmitted, in the same way as described above, to the bevel gear 25, larger bevel gear 26 and winder shaft 27 due to the engagement between the camming surface of the cam 15 and the roller 23, thus accomplishing film winding and shutter charge. Upon completion of the film winding, the shutter is released again. It will be seen that as long as the operating button 4 remains depressed, a high-voltage circuit is formed to supply a voltage of E1 + E2 to the motor irrespective of the position of the switch S1, thereby enabling continuous phototaking to occur at a high speed. When the operating button 4 is released, the vertically extending lever 30 is returned to its initial position by the force of the spring 32 and the switches S2 and S3 are changed over to their respective contacts S2-1 and S3-1. If the film is then being wound (the switch S1 has been changed over to the contact S1-1), there will be formed a low-voltage circuit consisting of E1 – (6-3) – ⊖M⊕ – (S1-1) – (S3-1) – (6-2) – E1, as was first described herein, so that the inertia of the motor which has been revolved by the voltage of E1 + E2 during the continuous phototaking is consuded by the film winding and shutter charge until the number of revolutions of the motor M is determined by the voltage of the power source E1. Thus, upon completion of film winding and shutter charge, the first switch is changed over from the contact S1-1 to the contact S1-2. Thereupon, there is formed a short-circuiting circuit consisting of M − (S1-2) − (S2-1) − M, whereupon an electric brake acts to stop the motor M.

Also, when the operating button 4 is released at a position where film winding and shutter charge has been completed (i.e., switch S1 has been changed over to the contact S1-2), there is formed a short-circuiting circuit consisting of M − (S1-2) − (S2-1) − M to allow the action of an electric brake, but this electric brake is not sufficient to absorb all the inertia of the motor which has been revolved by the voltage of E1 + E2. In such a case, therefore, the shutter is released with the aid of the action of the cam 15 and the switch S1 is changed over to the contact S1-1, and just in the same way as described previously, film winding and shutter change is effected by the voltage of E1, whereafter the motor M is stopped by an electric brake upon completion of the film winding and shutter charge.

As an example, the present invention was experimentally applied to the power-driven film winder in a conventional 35mm camera. When a voltage of 15 volts was used for that winder which was designed to use a voltage of 12 volts for effecting continuous phototaking at a rate of four frames per second, the inertia of the motor could not all be absorbed, and the motor could not be stopped until it was disconnected from its power source. However, when the power-driven film winder of the present invention was tried using voltages of 12 and 15 volts for E1 and E2, respectively, the result was that continuous phototaking at a rate of 7.5 frames per second could be achieved and the motor could be stopped exactly at a predetermined position where the film winding has been completed.

Figure 3:
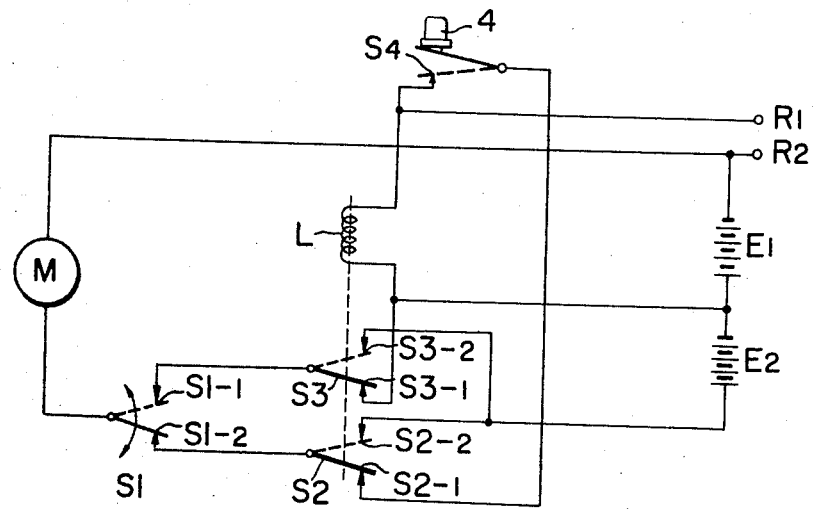
FIG. 3 is a circuit diagram showing a second embodiment of the present invention.

FIG. 3 shows a second embodiment of the present invention. In this embodiment, a relay switch S4 plays the part of the switches S2 and S3 used in the first embodiment shown in FIG. 2. The relay switch S4 is closed upon depression of the operating button 4, whereby the switches S1 and S3 are changed over. When it is desired to effect a remote control operation, a remote control switch may be inserted parallel to the relay S4 (i.e., terminals R1 and R2). This embodiment is thus entirely the same in function as that of FIG. 2.

Figure 4:
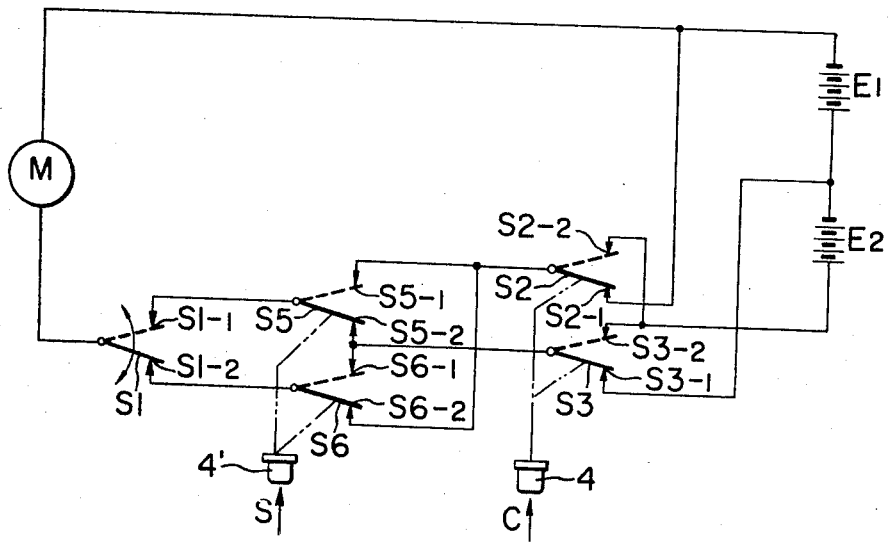
FIG. 4 is a circuit diagram showing a third embodiment of the present invention.

FIG. 4 shows a third embodiment of the present invention which includes switches S5 and S6 for single-frame phototaking inserted in the circuit shown in FIG. 3. Switches S2 and S3, which are changeable over by the operating button 4, are intended for the purpose of continuous phototaking and are very much the same in function as those shown in FIG. 2. An operating button 4' is used for single-frame phototaking. In a position where film winding and shutter charge has been completed and motor M is inoperative (i.e., a position where the switch S1 has been changed over to the contact S1-2, as shown in FIG. 4), the operating button 4' may be depressed to change over the switches S5 and S6 to their respective contacts S5-1 and S6-1. Thereupon, there is formed a low-voltage circuit comprising E1 − (S3-1) − (S6-1) − (S1-2) − M−E1, whereby the motor is energized to release the shutter. Upon releasing of the shutter, the switch S1 is changed over to the contact S1-1. Thereupon, there is formed a short-circuiting circuit consisting of M − (S1-1) − (S5-1) − (S2-1) − M, so that the motor is stopped by electric braking.

When the operating button 4' for single-frame phototaking is released, the switches S5 and S6 are returned to their respective contacts S5-2 and S6-2 to form a low-voltage circuit consisting of E1 − (S3-1) − (S5-2) − (S1-1) − M − E1, so that the motor is energized to accomplish film winding and shutter charge. Upon completion of the film winding and shutter charge, the switch S1 shifts to the contact S1-2 to form a short-circuiting circuit consisting of M − (S1-2) − (S6-2) − (S2-1) − M, whereby the motor is again stopped by electric braking.

During a single-frame phototaking cycle, there is little or no need for a high speed of film winding and, therefore, the motor M may be energized only by the battery E1, and once the film winding and shutter charge has been completed, the motor may be positively stopped.

Figure 5:
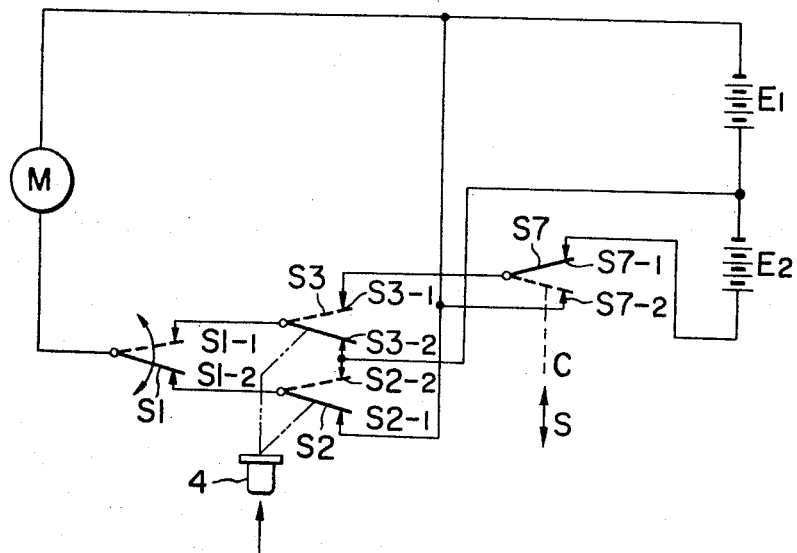
FIG. 5 is a circuit diagram showing a fourth embodiment of the present invention.

FIG. 5 shows a circuit according to a fourth embodiment of the present invention which selectively permits single-frame phototaking and continuous phototaking as in the case of FIG. 4. In this embodiment, S1 is a switch similar in function to the switch S1 shown in FIG. 2. S2 and S3 are interlocked switches changeable over upon depression of operating button 4, and these are similar in function to the switches S2 and S3 shown in FIG. 4 or to the switches S5 and S6 for single-frame phototaking shown in FIG. 4. S7 is a change-over switch for selecting a single-frame phototaking side S and a continuous phototaking side C.

When the change-over switch S7 has been changed over to the continuous phototaking side C, there is formed the same circuit as that shown in FIG. 2. However, when the operating button 4 is depressed at the end of film winding and shutter charge, there is formed a low-voltage circuit consisting of E1 − (S2-2) − (S1-2) − M − E1, so that the shutter is released.

Figure 6:
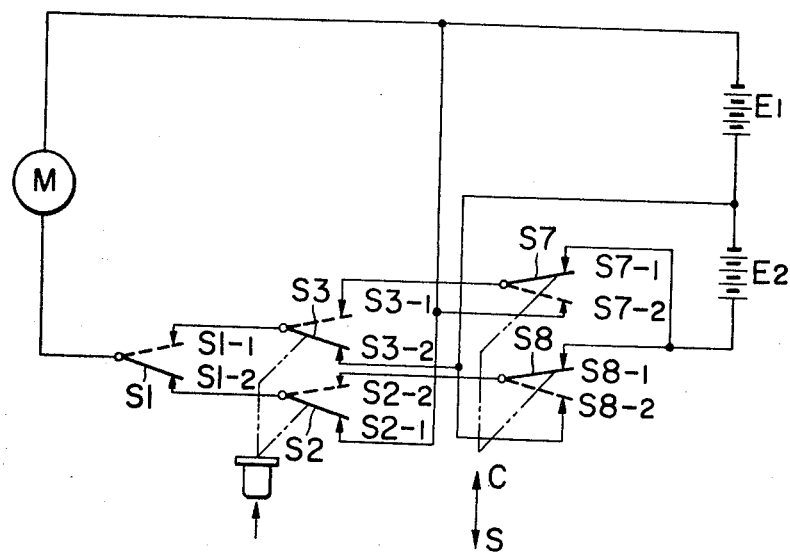
FIG. 6 is a circuit diagram showing a fifth embodiment of the present invention.

Those skilled in the art will appreciate that in the embodiment shown in FIG. 2, the voltage of E1 + E2 was also used for shutter releasing, but in view of the shorter time required for shutter releasing and the presence of an inertia resulting from film winding, the present embodiment permits a simpler construction of the change-over switch S7 where the voltage only of the battery E1 suffices. If required, the change-over switch S7 may be replaced by two-circuit change-over switches S7 and S8, as shown in FIG. 6, with the same result as that obtained in FIG. 2.

As soon as shutter releasing has been completed, the switch S1 is changed over to the contact S1-1 to form a high-voltage circuit consisting of E1 − M − (S1-1) − (S3-1) − S7 − E2 − E1, so that quick film winding and shutter charge is effected by the voltage of E1 + E2. Thus, a high-speed phototaking operation continues as long as the operating button 4 is depressed, and when the button is released, film winding and shutter charge for the last single frame is effected only by the power source E1, as in the case of FIG. 2, whereafter upon completion of such last film winding and shutter charge, there is formed a short-circuiting circuit consisting of M − (S1-2) − (S2-1) − M, thus stopping the motor by the action of an electric brake.

Also, if the change-over switch S7 is changed over to the single-frame phototaking side S and the operating button 4 depressed, a single-frame phototaking operation will be accomplished by the power source E1, as in the case of FIG. 4.

As has been described with respect to the various embodiments, the present invention consists in accomplishing film winding and shutter charge by using a voltage of E1 + E2 to achieve high-speed phototaking, and thereafter achieving a single-frame film winding by using the relatively low-voltage of the power source E1 alone and ensuring that the motor will stop at a predetermined end position of film winding. To realize this, other various modifications than those shown and described herein could be made irrespective of the type of continuous phototaking device. Further, the manually operable switch shown in FIGS. 4–6 may be replaced by a relay to effect remote control.

Thus, according to the present invention, there can be provided a power-driven film winder device for cameras which is capable of ensuring that the electric motor will be stopped exactly at a position where a predetermined amount of film winding and shutter charge has been completed, because single-frame winding and shutter charge after phototaking can be performed with the voltage reduced to a level at which any inertia can be absorbed by electric braking even if continuous phototaking at a rate of seven or more frames per second is effected by supplying the motor with such a voltage that inertia cannot be absorbed by he electric brake alone to prevent the motor from being stopped at a predetermined position.

I believe that the construction and operation of my novel film winding device for cameras will now be understood, and that its advantages will be fully appreciated by those persons skilled in the art.

I claim:

1. In a camera with automatic film advance and shutter cocking means, the combination comprising:
   an electric motor;
   drive means interlocked with said motor to cock and release a shutter and advance a film with rotation of said motor;
   an electrical switch movable between a first and a second position;
   means responsive to the movement of said drive means automatically to move said switch to said second position upon completion of film advancing and shutter cocking and to said first position upon completion of shutter releasing;
   a first electrical power source;
   a second electrical power source connected in series with said first power source;
   a high-voltage circuit including said first and second electrical power sources to energize said motor by the total voltage of the both power sources;
   a low-voltage circuit including one of said electrical power sources only to energize said motor;
   a circuit for short-circuiting two terminals of said motor to stop said motor;
   switching means for controlling said low and high voltage circuits movable between a first position in which said high-voltage circuit is closed in either position of said switch and a second position in which said low-voltage circuit is closed when said switch is in its first position and in which said short-circuiting circuit is closed when said switch is in its second position;
   said switching means normally being in said second position thereof; and
   manually operable means for maintaining said switching means at its first position while said operable means is operated.

2. A camera according to claim 1, further comprising:
   second switching means provided between said switch and said first-mentioned switching means, said second switching means being movable between a first position in which said low-voltage circuit is closed when said switch and said first-mentioned switching means are in their respective second positions and in which said short-circuiting circuit is closed when said switch is in its first position but said first-mentioned switching means is in its second position and a second position in which said low-voltage circuit is closed when said switch is in its first position but said first-mentioned switching means is in its second position and in which said short-circuiting circuit is closed when said switch and said first-mentioned switching means are in their respective second positions;
   said second switching means normally being in its second position; and
   second manually operable means for maintaining said second switching means at its first position while said second operable means is operated.

3. A camera according to claim 1, wherein said electrical switch includes a first contact connected with one of the terminals of said motor, a second contact connected with said first contact in the first position of said switch and a third contact connected with said first contact in the second position of said switch, and wherein said first-mentioned switching means includes second and third electrical switches interlocked with each other, said second switch being connected with said second contact of said first-mentioned switch and selectively connectable with first and second contacts, said third switch being connected with said third contact of said first-mentioned switch and selectively connected with first and second contacts, each of said second and said third switches being in contact with the first contact thereof when said first switching means is in its first position and with the second contact thereof when said first switching means is in its second position, the first contacts of said second and third switches being connected with one of the terminals of said second electrical power source so as to close said high-voltage circuit in either position of said first-mentioned switch when said first switching means is in its first position, said second contact of said second switch being connected with one of the terminals of said first electrical source so as to close said low-voltage circuit when said first switching means is in its second position but said first-mentioned switch is in its first position, said second contact of said third switch being connected with the other terminal of said first electrical source so as to close said short-circuiting circuit when said first switching means and said first-mentioned switch are in their respective second positions.

4. A camera according to claim 2, wherein said first-mentioned electrical switch includes a first contact connected with one of the terminals of said motor, a second contact connected with said first contact in the first position of said first-mentioned switch and a third contact connected with said first contact in the second position of said first-mentioned switch, said second switching means includes fourth and fifth electrical switches interlocked with each other, said fourth electrical switch being connected with said second contact of said first-mentioned switch and selectively connectable with first and second contacts thereof, said fifth electrical switch being connected with said third contact of said first-mentioned switch and selectively connectable with first and second contacts thereof, each of said fourth and fifth switches being connected with the first contact thereof when said first switching means is in its first position and with the second contact thereof when said first switching means is in its second position, and said first switching means includes second and third electrical switches interlocked with each other, said second switch being selectively connectable with first and second contacts thereof and connected both with said second contact of said fourth switch and said first contact of said fifth switch, said third switch being selectively connectable with first and second contacts thereof and connected both with said first contact of said fourth switch and said second contact of said fifth switch, each of said second and third switches being in contact with the first contact thereof when said first switching means is in its second position, the first terminals both of said second and said third switch being connected with one of the terminals of said second electrical power source to form said high-voltage circuit, said second terminal of said second switch being connected with one of the terminals of said first electrical power source to form said low-voltage circuit, the second contact of said third switch being connected with the other terminal of said first electrical power source to form said short-circuiting circuit.

5. In a camera with automatic film advance and shutter cocking means, the combination comprising:
an electric motor;
drive means interlocked with said motor so as to cock and release a shutter and advance a film with rotation of said motor;
an electrical switch movable between a first and a second position;
means responsive to the movement of said drive means to automatically move said switch to its second position upon completion of film advancing and shutter cocking and to its first position upon completion of shutter releasing;
a first electrical power source;
a second electrical power source connected in series with said first electrical power source;
a high-voltage circuit including said first and second electrical power sources to energize said motor by the total voltage of the both power sources;
a low-voltage circuit including only said first electrical power source to energize said motor by the voltage of said first power source;
a circuit for short-circuiting two terminals of said motor to stop said motor;
first switching means movable between a first position in which said low-voltage circuit is closed when said switch is in its first position and a second position in which said short-circuiting circuit is closed when said switch is in its second position;
said first switching means normally being in said second position thereof;
first manually operable means for maintaining said first switching means at its first position while said operable means is operated;
second switching means provided between said switch and said first switching means, said second switching means being movable between a first position in which said low-voltage circuit is closed when said switch and said first switching means are in their respective second positions and in which said short-circuiting circuit is closed when said switch is in its first position but said first switching means is in its second position and a second position in which said low-voltage circuit is closed when said switch is in its first position but said first switching means is in its second position and in which said short-circuiting circuit is closed when said switch and said first switching means are in their respective second positions;
said second switching means normally being in its second position;
second manually operable means for maintaining said second switching means at its first position while said second operable means is operated;
third switching means movable between a first position for single-frame phototaking in which said high-voltage circuit is closed when said switch and said first switching means are in their respective first positions and in which said low-voltage circuit is closed when said switch is in its second position but said first switching means is in its first position and a second position for continuous phototaking in which said low-voltage circuit is closed when said switch is in its second position but said first switching means is in its first position and in which said short-circuiting circuit is closed when said switch and said first switching means are in their respective first positions; and
third manually operable means for changing over said third switching means between the first and second positions thereof.

6. A camera according to claim 5, wherein said first-mentioned electrical switch includes a first contact connected with one of the terminals of said motor, a second contact connected with said first contact in the first position of said first-mentioned switch and a third contact connected with said first contact in the second position of said first-mentioned switch, said first switching means includes second and third electrical switches interlocked with each other, said second switch being connected with said second contact of said first-mentioned switch and selectively connectable with first and second contacts, said third switch being connected with said third contact of said first-mentioned switch and selectively connectable with first and second contacts, each of said second and third switches being in contact with the first contact thereof when said first switching means is in its first position and with the second contact thereof when said first switching means is in its second position, both the second contact of said second switch and the first contact of said third switch being connected with one of the terminals of said first-mentioned switch to form said low-voltage circuit, the second contact of said third switch being connected with one of the terminals of said second power source to form said short-circuiting circuit, and said third switching means includes a first contact connected with the first contact of said second switch, a second contact connected with one of the terminals of said second power source to form said high-voltage circuit, and a third contact connected with one of the terminals of said first power source to form said short-circuiting circuit.

* * * * *

O-203-N
(N-314)

UNITED STATES PATENT OFFICE
CERTIFICATE OF CORRECTION

Patent No. 3,710,705      Dated January 16, 1973

Inventor(s) SHUJI KIMURA

It is certified that error appears in the above-identified patent and that said Letters Patent are hereby corrected as shown below:

Front page, beneath "[21] Appl. No.: 55,055", insert:

-- [30]      Foreign Application Priority Date

January 27, 1971    Japan..........46/2716 --

Column 3, line 27, change "29a" to -- 28a --.
Column 7, line 31, change "he" to -- the --.

Signed and sealed this 10th day of July 1973.

(SEAL)
Attest:

EDWARD M. FLETCHER, JR.      Rene Tegtmeyer
Attesting Officer            Acting Commissioner of Patents